United States Patent Office 3,255,151
Patented June 7, 1966

---

3,255,151
STABILIZATION OF POLYPROPYLENE AGAINST DISCOLORATION
Arthur C. Hecker, Forest Hills, Otto S. Kauder, Seaford, and Norman L. Perry, Jamaica, N.Y., assignors to Argus Chemical Corporation, a corporation of New York
No Drawing. Filed Sept. 2, 1959, Ser. No. 837,600
10 Claims. (Cl. 260—45.9)

This invention relates to stabilizer combinations useful in the stabilization of polypropylene against discoloration and embrittlement during ageing and at elevated temperatures, and to the stabilized polypropylene thereby obtained.

Polypropylene is a tough, high-melting polymeric material, but its stability leaves much to be desired in several respects. The polymer shows a tendency to rapidly decrease in melt viscosity when kept at elevated temperatures for the time required in milling, calendering, extrusion, injection molding and fiber forming equipment. It also shows a tendency to discolor and to become brittle when aged at elevated temperatures. In all probability, the changes leading to this deterioration in properties arise from chemical modification of the polymer, but whether this is due to oxidation or to some other effect is not yet known.

A number of stabilizers have been proposed to cope with these problems. However, no stabilizer has been found which alone is capable of overcoming all of the difficulties. Groups of stabilizers, called "stabilizer systems," have been proposed. The effect of a plurality of stabilizers is, however, hard to predict, because the possible effects multiply geometrically with the number of stabilizers in the system. The various stabilizers can introduce effects by reaction between themselves, and with the various modified polymers, and other compounds that may be present or may be produced by the stabilizers. It is possible in a complex stabilizer system that the first stabilizer may effect the desired correction in the properties of the polymer but be itself not sufficiently stable, so that a second stabilizer is needed to stabilize the first. A third stabilizer may even be needed to help stabilize the second. In these circumstances, developing a stabilizer system which is capable of coping with more than one variable becomes a quite complex problem.

In accordance with the instant invention, a stabilizer system is provided which considerably improves the resistance of the polymer to discoloration and embrittlement with ageing at elevated temperatures. The stabilizer system of the invention comprises the combination of at least two compounds, an organic polysulfide and at least one additional stabilizer selected from the group consisting of phenols and organic compounds containing a trivalent phosphorus atom. The polysulfide is not itself a stabilizer, but it is capable of considerably extending the duration of the stabilizing effect of the phenol and/or the phosphite. In addition to these effects, there may be observed an improved stabilization against change in melt viscosity at elevated temperatures. Components from all three classes together give a more enhanced effect than the combinations of two.

These effects are surprising, inasmuch as the organic polysulfide alone has no noticeable stabilization effect. The phenol alone gives an improved resistance to embrittlement with ageing at elevated temperatures, but little assistance as to maintenance of color. The phosphite alone is a rather poor stabilizer, although it assists in resisting discoloration. Nonetheless, but polysulfide when added to either or both of these is capable of considerably improving resistance to discoloration, as well as extending stability against embrittlement.

Each stabilizing component of the stabilizer combination should have a very low vapor pressure at the working temperature. Preferably, the stabilizer is substantially nonvolatile at this temperature, so that it will not be lost from the mix during hot-working, which in some instances requires a considerable period of time. It also should be compatible with the resin at all temperatures to which the composition is to be subjected.

The phenol contains one or more phenolic nuclei. One, two or more phenolic groups may be present. In addition, the phenolic nucleus may contain an amino group.

The alkyl-substituted phenols and poly-nuclear phenols have a higher boiling point, and therefore are preferred because of their lower volatility. The alkyl group or groups should total at least six carbon atoms. The longer the alkyl chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in the alkyl group, and a total of not over about fifty carbon atoms. The compounds may have from one to five alkyl radicals, preferably in the ortho or para positions to the phenolic group.

Exemplary of phenols in this class are p-octyl phenol, p-dodecyl phenol, p-ocetadecyl phenol, p-isooctyl-m-cresol, p-isohexyl-o-cresol, 2,6-ditertiary butyl phenol, 2,6-diisopropyl phenol, 2,6-ditertiary butyl-p-cresol, methylenebis-2,6-ditertiary butyl phenol, 2,2-bis(4-hydroxyphenyl) propane, methylenebis-p-cresol, 4,4'-thiobisphenol, 4,4'-thiobis (3-methyl-6-tertiary butyl phenol), 2,2'-thiobis (4-methyl-6-tertiary butyl phenol), 2,6-diisooctyl resorcinol, 4-octyl pyrogallol, and 3,5-ditertiary butyl catechol. Among the aminophenols which can be used are 2-isooctyl-p-aminophenol, N-stearoyl-p-aminophenol, 2,6-diisobutyl-p-aminophenol, and N-ethylhexyl-p-aminophenol.

The organic trivalent phosphorus compound can be any organic compound containing a trivalent phosphorus atom. Usually, the compound will not have more than about 50 carbon atoms. Most commonly occurring are the phosphites $(RA)_3P$ and the phosphines $R_3P$ in which A can be oxygen or sulfur or a mixture of the same, and R can be selected from the group consisting of aryl, alkyl, cycloalkyl, aralkyl and alkaryl groups in any combinations. Preferably, in the phosphines at least one R is aryl.

Exemplary are triphenyl phosphine, diphenyl methyl phosphine, tritolyl phosphine, trixylyl phosphine, phenyl dicyclohexyl phosphine, phenyldiethyl phosphine, tribenzyl phosphine, di-2-ethyl hexyl phenyl phosphine, triphenyl phosphite, tricresyl phosphite, tri(dimethylphenyl) phosphite, tributyl phosphite, trioctyl phosphite, tridodecyl phosphite, octyl diphenyl phosphite, dioctyl phenyl phosphite, tri(octylphenyl) phosphite, tri(nonylphenyl) phosphite, tribenzyl phosphite, butyl dicresyl phosphite, octyl di(octylphenyl) phosphite, tri(2-ethylhexyl) phosphite, tri(2-cyclohexylphenyl) phosphite, tri-alpha-naphthyl phosphite, tri(phenylphenyl) phosphite, and tri(2-phenylethyl) phosphite.

The organic polysulfide is any organic sulfur compound containing two or more sulfur atoms linked together in a polysulfide unit. Usually, the polysulfide will not have more than fifty carbon atoms. They can be defined by the formula:

$$R(S)_n\text{—}R$$

wherein $n$ is the number of sulfur atoms in the polysulfide unit $(S)_n$ and ranges from two to about six, and R is an organic radical having from one to about thirty carbon atoms, such as alkyl, aryl, alkaryl, aralkyl, cycloalkyl and heterocyclic radicals. The R radical also may contain nitrogen, as in the case of the thiuram polysulfides, or oxygen, as in the case of alkoxy, carboxy, and alkylol radicals. The following compounds are typical: n-dodecyl trisulfide, tertiary dodecyl disulfide, tetramethyl thiuram disulfide, tertiary octyl thiuram tetrasulfide, dimethyl thiuram hexasulfide, tetraethyl thiuram trisulfide, benzothiazyl disulfide, paratertiary butyl phenyl trisulfide, dioctyl dithiodiacetate, dibenzyl disulfide, dibenzyl tetra sulfide, and dibenzyl trisulfide.

A sufficient amount of the stabilizer combination is used to improve the stability against discoloration and embrittlement under the conditions to which the polypropylene will be subjected. Very small amounts are usually adequate. Amounts within the range from about 0.005 to about 10% total stabilizers by weight of the polypropylene are satisfactory. Preferably, from 0.1 to 1% is employed for optimum stabilization. There is no real upper limit on the amount of stabilizers, but inasmuch as these compounds are expensive, it is usually desirable to use the minimum necessary to give the required stabilization.

In general, the optimum results will be obtained with combinations containing an amount of phenol within the range from 0.005 to 1%, an amount of organic trivalent phosphorus compound within the range from 0.1 to 2%, and an amount of organic polysulfide within the range from 0.05 to 1%.

The invention is applicable to any propylene polymer, such as polypropylene, including polypropylene previously stabilized with other stabilizers. Isotactic or Ziegler-process polypropylene, available commercially under the name Pro-Fax, and having a softening or hot-working temperature of about 350° F., is an example of a sterically regular polypropylene polymer. Mixtures and copolymers of a polypropylene with other compatible polymers not reactive with the polypropylene stabilizer combination also can be treated, for example, mixtures of polyethylene and polypropylene, and copolymers of propylene and ethylene which have a sufficient amount of propylene to present the instability problem that is resolved by the stabilizer combinations of the invention. As used in this specification and claims, the term "propylene polymer" includes polypropylene (homopolymer) and also copolymers of propylene with other compatible monomers, and mixtures of propylene polymers with other compatible polymers not reactive with the stabilizer combination of this invention, which contain a sufficient amount of propylene to present the instability problem that is resolved by the stabilizer combination of this invention.

The stabilizer combination is incorporated in the polymer in suitable mixing equipment, such as a mill or a Banbury mixer. If the polypropylene has a melt viscosity which is too high for the desired use, the polypropylene can be worked until its melt viscosity has been reduced to the desired range before addition of the stabilizer. However, polypropylenes in a range of workable melt viscosities are now available. Mixing is continued until the mixture is substantially uniform. The resulting composition is then removed from the mixing equipment and reduced to the size and shape desired for marketing or use.

The stabilized polypropylene can then be worked into the desired shape, such as by milling, calendering, extrusion or injection molding or fiber forming. In such operations, it will be found to have a considerably improved resistance to reduction in melt viscosity during the heating as well as a better resistance to discoloration and embrittlement on ageing and heating.

The following examples in the opinion of the inventors represent the best embodiments of their invention:

EXAMPLES 1–4

Isotactic polypropylene not previously stabilized (Pro-Fax 6501, reduced specific viscosity 4), 200 parts, was blended with the amount of the stabilizer shown in the table below, briefly mixed by hand and milled on a 2-roll mill for three minutes at 170° C. after incipient fusion.

The compositions thus obtained were subjected to an accelerated heating test to determine resistance to discoloration and embrittlement upon ageing. The compositions were molded to slabs about 6" x 1½" x 40 mils, and the slabs heated in an oven at 150° C. in circulating air.

Discoloration was noted according to the following scale, compared to an unaged sample of Pro-Fax 6501 containing no additive.

Color: Scale
No discoloration _____ 1
Slight discoloration _____ 2
Moderate discoloration _____ 3
Severe discoloration _____ 4
Completely discolored _____ 5

The slabs were tested for embrittlement at intervals of 24 hours until the slab could be snapped.

The following results were obtained:

*Table 1*

| | Stabilizer | Amount (percent by weight) | Hours to Failure | | Color | |
|---|---|---|---|---|---|---|
| | | | Average | Range | Initial | Finish [1] |
| Control A | None | | 12 | 7–19 (5 samples) | 1 | 3 |
| Control B | 4,4'-thiobis(3-methyl-6-tertiary-butyl phenol) | 0.01 | 26 | 20–37 (4 samples) | 1 | 3 |
| Control C | n-Dodecyl disulfide | 0.5 | 20 | 12–25 (4 samples) | 1 | 3 |
| Control D | Isooctyl diphenyl phosphite | 0.25 | 12 | 7–21 (5 samples) | 1 | 2 |
| Example No. 1 | 4,4'-thiobis(3-methyl-6-tertiary-butyl phenol) Isooctyl diphenyl phosphite | 0.01 0.25 | 35 | 23–61 (7 samples) | 1 | 3 |
| Example No. 2 | 4,4'-thiobis(3-methyl-6-tertiary-butyl phenol) n-Dodecyl disulfide | 0.01 0.5 | 46 | 29–60 (6 samples) | 1 | 3 |
| Example No. 3 | n-Dodecyl disulfide Isooctyl diphenyl phosphite | 0.5 0.25 | 22 | 17–76 (14 samples) | 1 | 2 |
| Example No. 4 | 4,4'-thiobis(3-methyl-6-tertiary-butyl phenol) n-Dodecyl disulfide Isooctyl diphenyl phosphite | 0.01 0.5 0.25 | 129 | 88–162 (average of 21 samples) | 1 | 2 |

[1] 100 hours or failure, whichever is earlier.

The improvement in resistance to embrittlement and to discoloration in Examples 1 to 4 over the controls A, B, C and D is evident from this data. The combinations of two gave a significant improvement, but the combination of all three (Example 4) was by far the best.

EXAMPLES 5 to 7

Example 4 was repeated using considerably larger quantities of stabilizer. The samples were tested by the test method described in Examples 1 to 4. The following results were obtained:

*Table II*

| Example No. | Stabilizer | Amount (percent by weight) | Hours to Failure | Color Initial | Color After 100 hrs. |
|---|---|---|---|---|---|
| 5 | 4,4'-thiobis(3-methyl-6-tertiary-butyl phenol). n-Dodecyl disulfide. Isooctyl diphenyl phosphite | 0.01 1.0 0.25 | 137 | 1 | 2 |
| 6 | 4,4'-thiobis(3-methyl-6-tertiary-butyl phenol). n-Dodecyl disulfide. Isooctyl diphenyl phosphite | 0.01 2.0 0.25 | 233 | 1 | 2 |
| 7 | 4,4'-thiobis(3-methyl-6-tertiary-butyl-phenol). n-Dodecyl disulfide. Isooctyl diphenyl phosphite | 0.04 2.0 1.0 | 281 | 1 | 2 |

This data shows the considerable improvement obtained over Example 4 using higher concentrations of the stabilizer combination. The final color was good in each case.

EXAMPLES 8–10

Examples 5 to 7 were repeated, substituting Moplen MD, an unstabilized polypropylene, RSV about 4.2. The following results were obtained:

*Table III*

| Example No. | Stabilizer | Amount (percent by weight) | Hours to Failure | Color Initial | Color After 100 hrs. |
|---|---|---|---|---|---|
| 8 | 4,4'-thiobis(3-methyl-6-tertiary-butyl phenol). n-Dodecyl disulfide. Isooctyl diphenyl phosphite | 0.01 1.0 0.25 | 137 | 1 | 2 |
| 9 | 4,4'-thiobis(3-methyl-6-tertiary-butyl phenol). n-Dodecyl disulfide. Isooctyl diphenyl phosphite | 0.01 2.0 0.25 | 196 | 1 | 2 |
| 10 | 4,4'-thiobis(3-methyl-6-tertiary-butyl phenol). n-Dodecyl disulfide. Isooctyl diphenyl phosphite | 0.04 2.0 1.0 | 812 | 2 | 3 |

This data shows the considerable improvement obtained over Example 4 using higher concentrations of the stabilizer combination. The final color was good in each case.

EXAMPLES 11–13

Examples 5 to 7 were repeated, substituting an unstabilized polypropylene designated PS–1814 having an RSV of about 3.8. The following results were obtained:

*Table IV*

| Example No. | Stabilizer | Amount (percent by weight) | Hours to Failure | Color Initial | Color After 100 hrs. |
|---|---|---|---|---|---|
| 11 | 4,4'-thiobis(3-methyl-6-tertiary-butyl phenol). n-Dodecyl disulfide. Isooctyl diphenyl phosphite | 0.01 1.0 0.25 | 159 | 1 | 2 |
| 12 | 4,4'-thiobis(3-methyl-6-tertiary-butyl phenol). n-Dodecyl disulfide. Isooctyl diphenyl phosphite | 0.01 2.0 0.25 | 186 | 1 | 2 |
| 13 | 4,4'-thiobis(3-methyl-6-tertiary-butyl phenol). n-Dodecyl disulfide. Isooctyl diphenyl phosphite | 0.04 2.0 1.0 | 555 | 2 | 3 |

This data shows the considerable improvement obtained over Example 4 using higher concentrations of the stabilizer combination. The final color was good in each case.

EXAMPLE 14

Example 4 was repeated, using 0.5% 4,4'-thiobis(3-methyl-6-tertiary-butyl phenol), 0.5% n-dodecyl disulfide and 0.25% isooctyl diphenyl phosphite. Twenty-one compositions gave an average of 709 hours to failure under the tests of Examples 1 to 4, the spectrum ranging from 253 to 1298 hours to failure. The initial color was pale cream, and the color after 100 hours was yellow.

These results are to be compared with a similar series prepared using only 0.5% of the 4,4'-thiobis(3-methyl-6-tertiary-butyl phenol); these gave an average of 380 hours to failure, with a range of from 160 to 790. The initial color was pale cream, but dark brown after 100 hours.

EXAMPLES 15–21

A series of compositions were made, using Pro-Fax 6501, following the procedures of Examples 1 to 4, with the polysulfides listed in the table below. The stabilizer formulation was composed of 0.5% of the polysulfide, 0.01% 4,4′-thiobis(3-methyl-6-tertiary-butyl phenol), and 0.25% isooctyl diphenyl phosphite.

| Sulfides | Hours to Failure | Color | |
|---|---|---|---|
| | | Initial | Finish[1] |
| n-Dodecyl trisulfide | 110 | 1 | 2 |
| Tertiary-dodecyl disulfide | 90 | 1 | 2 |
| Tetramethyl thiuram disulfide | 110 | 2 | 3 |
| Dioctyl dithiodiacetate | 90 | 1 | 2 |
| Tertiary-octyl tetrasulfide | 132 | 1 | 2 |
| Benzothiazyl disulfide | 110 | 2 | 3 |
| p-Tertiary-butylphenyl trisulfide | 110 | 1 | 2 |

[1] 100 hours or failure, whichever is earlier.

EXAMPLES 22–25

A series of composition was made up, using Pro-Fax 6501 and different trivalent phosphorus compounds, following the procedure of Examples 1 to 4. The stabilizer combination was composed of 0.01% 4,4′-thiobis(3-methyl-6-tertiary-butyl phenol), 0.5% n-dodecyl disulfide and 0.25% of the trivalent phosphorus compound. The following results were obtained:

| | Hours to Failure | Color | |
|---|---|---|---|
| | | Initial | Final [1] |
| Tri-isodecyl phosphite | 92 | 1 | 2 |
| Tri-p-tertiary-butyl phenyl thiophosphite | 137 | 1 | 2 |
| 2-ethylhexyl-p-tertiaryoctylphenyl phosphites | 137 | 1 | 2 |
| Triphenyl phosphine | 161 | 1 | 2 |

[1] 100 hours or failure, whichever is earlier.

EXAMPLES 26–29

A group of compositions was made up, using Pro-Fax 6501 and a series of different phenols as listed in the table below, following the procedure of Examples 1 to 4. The stabilizer combination was composed of 0.5% of the phenol, 0.5% of n-dodecyl disulfide and 0.25% of 2-ethyl-hexyl diphenyl phosphite. The formulations were evaluated by the test of Examples 1 to 4, with the following results:

| | Hours to Failure | Color | |
|---|---|---|---|
| | | Initial | After 100 hrs. |
| Ethyl 736 (4,4′-thiobis (2,6-ditertiary-butylphenol) | 475 | 3 | 3 |
| Ethyl 720 (4,4′-methylenebis (2-methyl-6-tertiary butylphenol) | 259 | 2 | 3 |
| 4,4′-thiobis phenol | 399 | 3 | 3 |
| p-Lauroylaminophenol | 259 | 2 | 4 |

We claim:

1. A polypropylene composition having improved resistance to discoloration and embrittlement on aging and heating, comprising a propylene polymer and a sufficient amount to improve its resistance to discoloration and embrittlement of a stabilizer combination consisting essentially of from about 0.05 to about 1% based on the weight of polypropylene of an organic polysulfide having the formula $R(S)_nR$, wherein $n$ is a number within the range from about 2 to about 6, and each R is an organic radical having from one to about thirty carbon atoms and is selected from the group consisting of alkyl, aryl, alkaryl, aralkyl, cycloalkyl, heterocyclic, thiuram, and carboxy radicals; from about 0.1 to about 2% based on the weight of polypropylene of an organic trivalent phosphorus compound selected from the group consisting of phosphites, $(RA)_3P$, and phosphines, $R_3P$, wherein A is selected from the group consisting of oxygen and sulfur, and the R radicals are selected from the group consisting of aryl, alkyl, cycloalkyl, aralkyl and alkaryl groups having collectively a total of about fifty carbon atoms; and from about 0.005 to about 1% based on the weight of polypropylene of an organic phenol having up to about fifty carbon atoms the stabilizer combination being compatible with the propylene polymer, and having a low vapor pressure at propylene polymer working temperatures.

2. A polypropylene composition in accordance with claim 1 wherein the propylene polymer is a copolymer of ethylene and propylene.

3. A stabilizer combination for use in improving the resistance of polypropylene to discoloration and embrittlement on aging and heating, consisting essentially of from about 0.5 to about 10 parts by weight of an organic polysulfide having the formula $R(S)_nR$, wherein $n$ is a number within the range from about 2 to about 6, and each R is an organic radical having from one to about thirty carbon atoms and is selected from the group consisting of alkyl, aryl, alkaryl, aralkyl, cycloalkyl, heterocyclic, thiuram, and carboxy radicals; from about 1 to about 20 parts by weight of an organic trivalent phosphorus compound selected from the group consisting of phosphites, $(RA)_3P$, and phosphines, $R_3P$, wherein A is selected from the group consisting of oxygen and sulfur, and the R radicals are selected from the group consisting of aryl, alkyl, cycloalkyl, aralkyl and alkaryl groups having collectively a total of about fifty carbon atoms; and from about 0.05 to about 10 parts by weight of an organic phenol having up to about fifty carbon atoms, the stabilizer combination being compatible with the propylene polymer, and having a low vapor pressure at propylene polymer working temperatures.

4. A stabilizer combination in accordance with claim 3 wherein the phenol is an alkyl phenol in which the alkyl group has from about six to about eighteen carbon atoms.

5. A stabilizer combination in accordance with claim 3 wherein the phenol is a bisphenol.

6. A stabilizer combination in accordance with claim 3 wherein the phenol is an aminophenol.

7. A stabilizer combination in accordance with claim 3 wherein the trivalent phosphorus compound is an organic phosphite.

8. A stabilizer combination in accordance with claim 3 wherein the organic trivalent phosphorus compound is an organic phosphine.

9. A stabilizer combination in accordance with claim 3 consisting essentially of dodecyl disulfide, octyl diphenyl phosphite and 4,4′ - thiobis(3 - methyl-6-tertiary-butyl phenol).

10. A stabilizer combination in accordance with claim 9 comprising in addition, 4,4′-thiobis(3-methyl-6-tertiary-butyl phenol).

References Cited by the Examiner

UNITED STATES PATENTS

| | | | |
|---|---|---|---|
| 2,419,354 | 4/1947 | Howland et al. | 260—45.7 |
| 2,654,722 | 10/1953 | Young et al. | 260—45.9 |
| 2,773,907 | 12/1956 | Sullivan et al. | 260—45.95 |
| 2,791,576 | 5/1957 | Field et al. | 260—45.5 |
| 2,824,847 | 2/1958 | Fath | 260—45.7 |
| 2,882,263 | 4/1959 | Natta et al. | 260—93.7 |
| 2,889,306 | 6/1959 | Hawkins et al. | 260—45.95 |
| 2,889,307 | 6/1959 | Clayton | 260—45.95 |
| 2,956,042 | 10/1960 | Underwood et al. | 260—45.5 |
| 2,967,847 | 1/1961 | Hawkins et al. | 260—45.7 |
| 2,985,617 | 5/1961 | Salyer | 260—45.8 |
| 3,004,949 | 10/1961 | Chavassus | 260—45.7 |
| 3,020,259 | 2/1962 | Schulde et al. | 260—45.9 |
| 3,050,499 | 8/1962 | Gordon et al. | 260—45.7 |
| 3,056,759 | 10/1962 | Mercier et al. | 260—45.7 |
| 3,057,926 | 10/1962 | Coffield | 260—45.7 |
| 3,082,187 | 3/1963 | Fuchsman | 260—45.7 |

LEON J. BERCOVITZ, *Primary Examiner.*

ALLEN M. BOETTCHER, DAN ARNOLD, JOSEPH R. LIBERMAN, *Examiners.*